(12) United States Patent
Goitsuka

(10) Patent No.: US 10,293,697 B2
(45) Date of Patent: May 21, 2019

(54) VEHICLE

(71) Applicant: Toyota Jidosha Kabushiki Kaisha, Toyota-shi, Aichi-ken (JP)

(72) Inventor: Shinya Goitsuka, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/684,457

(22) Filed: Aug. 23, 2017

(65) Prior Publication Data
US 2018/0065490 A1 Mar. 8, 2018

(30) Foreign Application Priority Data
Sep. 5, 2016 (JP) ................................. 2016-172879

(51) Int. Cl.
*B60L 11/18* (2006.01)
*B60K 6/46* (2007.10)
*B60K 15/063* (2006.01)
*B60K 1/04* (2019.01)

(52) U.S. Cl.
CPC ............. *B60L 11/182* (2013.01); *B60K 1/04* (2013.01); *B60K 6/46* (2013.01); *B60K 15/063* (2013.01); *B60L 11/1812* (2013.01); *B60L 11/1818* (2013.01); *B60L 11/1877* (2013.01); *B60K 2001/0438* (2013.01); *B60K 2015/0634* (2013.01); *B60K 2015/0638* (2013.01); *B60L 2210/30* (2013.01); *B60Y 2306/01* (2013.01); *Y02T 10/7005* (2013.01); *Y02T 10/705* (2013.01); *Y02T 10/7072* (2013.01); *Y02T 10/7241* (2013.01); *Y02T 90/122* (2013.01); *Y02T 90/127* (2013.01); *Y02T 90/14* (2013.01); *Y10S 903/903* (2013.01)

(58) Field of Classification Search
CPC ........... B60L 11/1809–11/185; B60L 11/1877; B60K 2001/0438
See application file for complete search history.

(56) References Cited

U.S. PATENT DOCUMENTS

| 7,741,734 | B2 | 6/2010 | Joannopoulos et al. |
| 9,944,173 | B2 * | 4/2018 | Ajisaka ............... B60K 15/063 |
| 2007/0222542 | A1 | 9/2007 | Joannopoulos et al. |
| 2008/0278264 | A1 | 11/2008 | Karalis et al. |
| 2009/0195332 | A1 | 8/2009 | Joannopoulos et al. |
| 2009/0195333 | A1 | 8/2009 | Joannopoulos et al. |

(Continued)

FOREIGN PATENT DOCUMENTS

| AU | 2006269374 B2 | 10/2009 |
| AU | 2007349874 A2 | 1/2010 |

(Continued)

*Primary Examiner* — Erez Gurari
(74) *Attorney, Agent, or Firm* — Dinsmore & Shohl LLP

(57) ABSTRACT

An electrically powered vehicle includes: a floor panel forming a lower surface of the electrically powered vehicle; a battery disposed on a lower surface of the floor panel; and a power reception device disposed below the floor panel and configured to contactlessly receive electric power from a power transmission device provided externally. The power reception device has a lower surface that is located below a lower surface of the battery. The electrically powered vehicle is one of various kinds of vehicles such as a hybrid vehicle and an electric vehicle, in which protection of the battery is achieved.

5 Claims, 18 Drawing Sheets

(56) References Cited

U.S. PATENT DOCUMENTS

| | | |
|---|---|---|
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2012/0123710 A1 | 5/2012 | Gaul et al. |
| 2013/0193749 A1 | 8/2013 | Nakamura et al. |
| 2014/0320078 A1 | 10/2014 | Nakamura et al. |
| 2015/0123465 A1 | 5/2015 | Ichikawa |
| 2015/0357833 A1* | 12/2015 | Maekawa ............... H02J 50/90 307/104 |
| 2016/0046194 A1* | 2/2016 | Tsukamoto ............. H02J 5/005 307/104 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| EP | 1902505 A2 | 3/2008 |
| EP | 2130287 A1 | 12/2009 |
| EP | 2407338 A1 | 1/2012 |
| EP | 2985162 A1 | 2/2016 |
| IN | 735/DELNP/2008 | 5/2008 |
| IN | 6195/DELNP/2009 | 7/2010 |
| JP | 2009-501510 T | 1/2009 |
| JP | 2011-250593 A | 12/2011 |
| JP | 2013154815 A | 8/2013 |
| JP | 2014128124 A | 7/2014 |
| JP | 2014226016 A | 12/2014 |
| KR | 20080031398 A | 4/2008 |
| KR | 20100015954 A | 2/2010 |
| TW | I464416 B | 12/2014 |
| WO | 2007008646 A2 | 1/2007 |
| WO | 2008118178 A1 | 10/2008 |
| WO | 2010103639 A1 | 9/2010 |
| WO | 2013076804 A1 | 5/2013 |
| WO | 2013168242 A1 | 11/2013 |
| WO | 2014167978 A1 | 10/2014 |

* cited by examiner

FIG.1
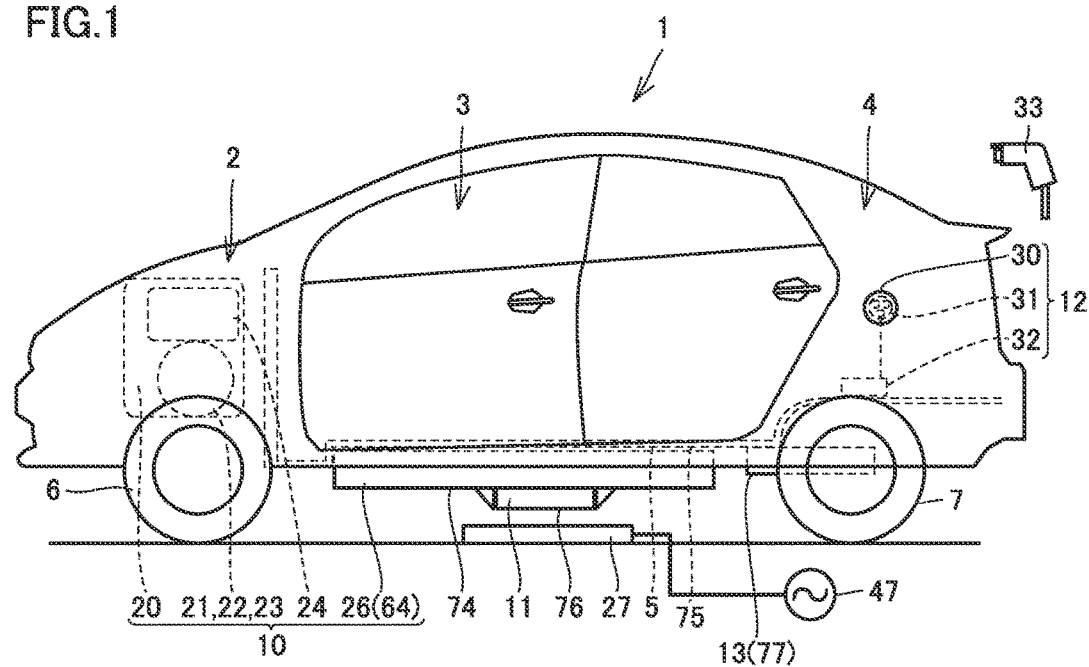
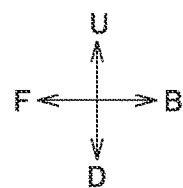

FIG.3
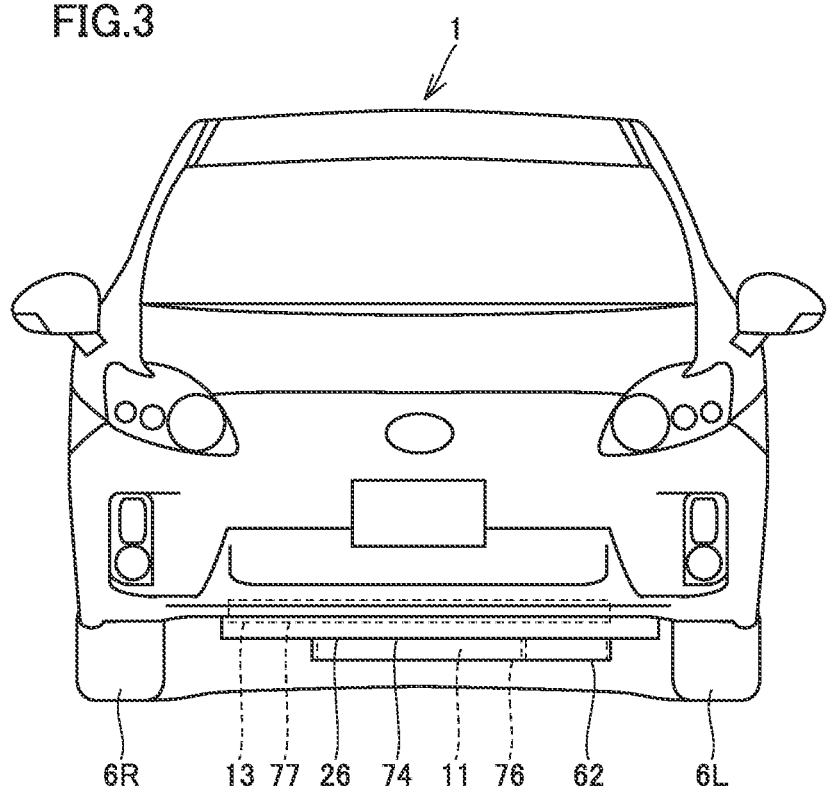
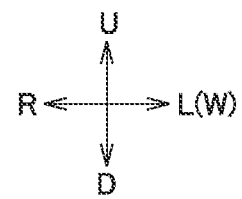

FIG.26
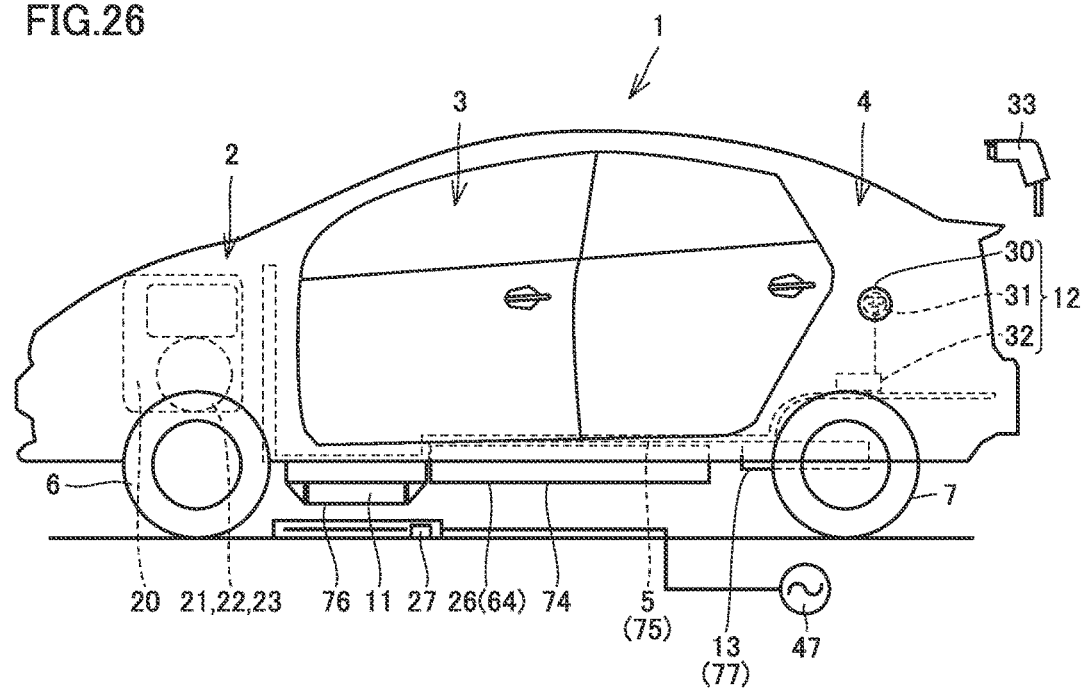
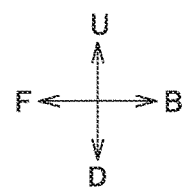

VEHICLE

CROSS-REFERENCE TO RELATED APPLICATIONS

This nonprovisional application claims priority to Japanese Patent Application No. 2016-172879 filed on Sep. 5, 2016, with the Japan Patent Office, the entire contents of which are hereby incorporated by reference.

BACKGROUND

Field

The present disclosure relates to a contactlessly-chargeable vehicle.

Description of the Background Art

A hybrid vehicle disclosed in Japanese Patent Laying-Open No. 2011-250593 includes a power reception device and a battery. The power reception device is configured to contactlessly receive electric power from a power transmission device provided on the ground, and supply the received electric power to the battery. This power reception device is disposed on a lower surface of a rear floor panel of the hybrid vehicle. The battery is disposed on an upper surface of the rear floor panel.

SUMMARY

For vehicles such as a hybrid vehicle and an electric vehicle, the battery capacity needs to be increased in order to increase an EV travelling distance that the vehicle can travel with electric power from the battery. When a large capacity battery is arranged inside the vehicle, however, the space for a vehicle compartment or a luggage compartment is reduced.

Accordingly, there is a conceivable method for preventing a space reduction in a vehicle compartment or a luggage compartment by arranging a battery on the lower surface side of the vehicle.

In a vehicle having a lower surface on which a power reception device is arranged, if a battery is arranged on the lower surface of the vehicle, the power reception device and the battery are to be located on the lower surface side of the vehicle.

In the state where the power reception device and the battery are arranged on the lower surface of the vehicle, the power reception device and the battery may hit the ground when the vehicle travels on an uneven road. Also, flying substances such as small stones struck by wheels may hit the power reception device or the battery.

When the power reception device is damaged, the battery becomes unable to be charged using the power reception device, but the travelling function of the vehicle is still maintained. When the battery is damaged, however, it becomes difficult to ensure the travelling function of the vehicle. Therefore, protection of the battery needs to be prioritized over protection of the power reception device.

The present disclosure has been made in light of the above-described problems. An object of the present disclosure is to protect a battery provided in a vehicle having the battery and a power reception device disposed on a lower surface thereof.

A vehicle of the present disclosure includes a floor panel, a battery, and a power reception device. The floor panel forms a lower surface of the vehicle. The battery is disposed on a lower surface of the floor panel. The power reception device is disposed below the floor panel and configured to contactlessly receive electric power from a power transmission device provided externally. The power reception device has a lower surface that is located below a lower surface of the battery.

According to the above-described vehicle, when the vehicle travels on the road on which bumps are formed, the power reception device is more likely to contact the ground before the battery contacts the ground or the like. Thereby, the power reception device functions as a shock absorbing member, so that the battery can be protected.

The vehicle of the present disclosure further includes an engine and a fuel tank for storing fuel to be supplied to the engine. The fuel tank has a lower surface that is located above the lower surface of the power reception device.

According to the above-described vehicle, when the vehicle travels on the road having bumps formed thereon, the power reception device is more likely to contact the road surface before the fuel tank contacts the road surface. Thereby, the fuel tank can be protected.

The vehicle of the present disclosure further includes an engine and a fuel tank for storing fuel to be supplied to the engine. The fuel tank has a lower surface that is located above the lower surface of the power reception device and the lower surface of the battery. According to the above-described vehicle, the fuel tank is less likely to contact the ground than the power reception device and the battery are, so that the fuel tank can be protected.

According to the vehicle of the present disclosure, a travelling distance that the vehicle can travel with fuel fully filling the fuel tank is longer than a travelling distance that the vehicle can travel with electric power from the battery fully charged. According to the above-described vehicle, damage to the fuel tank is avoided, so that it becomes possible to ensure a long travel distance of the vehicle.

The vehicle of the present disclosure further includes a charging unit to which a charging plug provided externally is connected, the charging unit being configured to supply, to the battery, electric power supplied through the charging plug. The charging unit is disposed above the floor panel.

According to the above-described vehicle, the charging unit is disposed above the floor panel. Accordingly, even if the power reception device is brought into contact with the ground and thereby damaged, damage to the charging unit can be avoided. Therefore, even if the power reception device is damaged, the battery can be charged using the charging unit.

According to the vehicle of the present disclosure, the power reception device is disposed on the lower surface of the battery. According to the above-described vehicle, the power reception device is more likely to contact the ground before the battery contacts the ground, thereby allowing improvement in protection of the battery. Furthermore, even when there are flying substances such as small stones struck by wheels, it becomes possible to suppress that the battery is hit by such flying substances like small stones because the power reception device is disposed on the lower surface of the battery.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 1 is a schematic diagram showing an electrically powered vehicle.

FIG. 2 is a block diagram schematically showing a drive device, a power reception device, a charging device, and the like.

FIG. 3 is a front view showing the electrically powered vehicle.

FIG. 26 is a schematic diagram showing a modification of the electrically powered vehicle.

DESCRIPTION OF THE EMBODIMENTS

Figure 2:
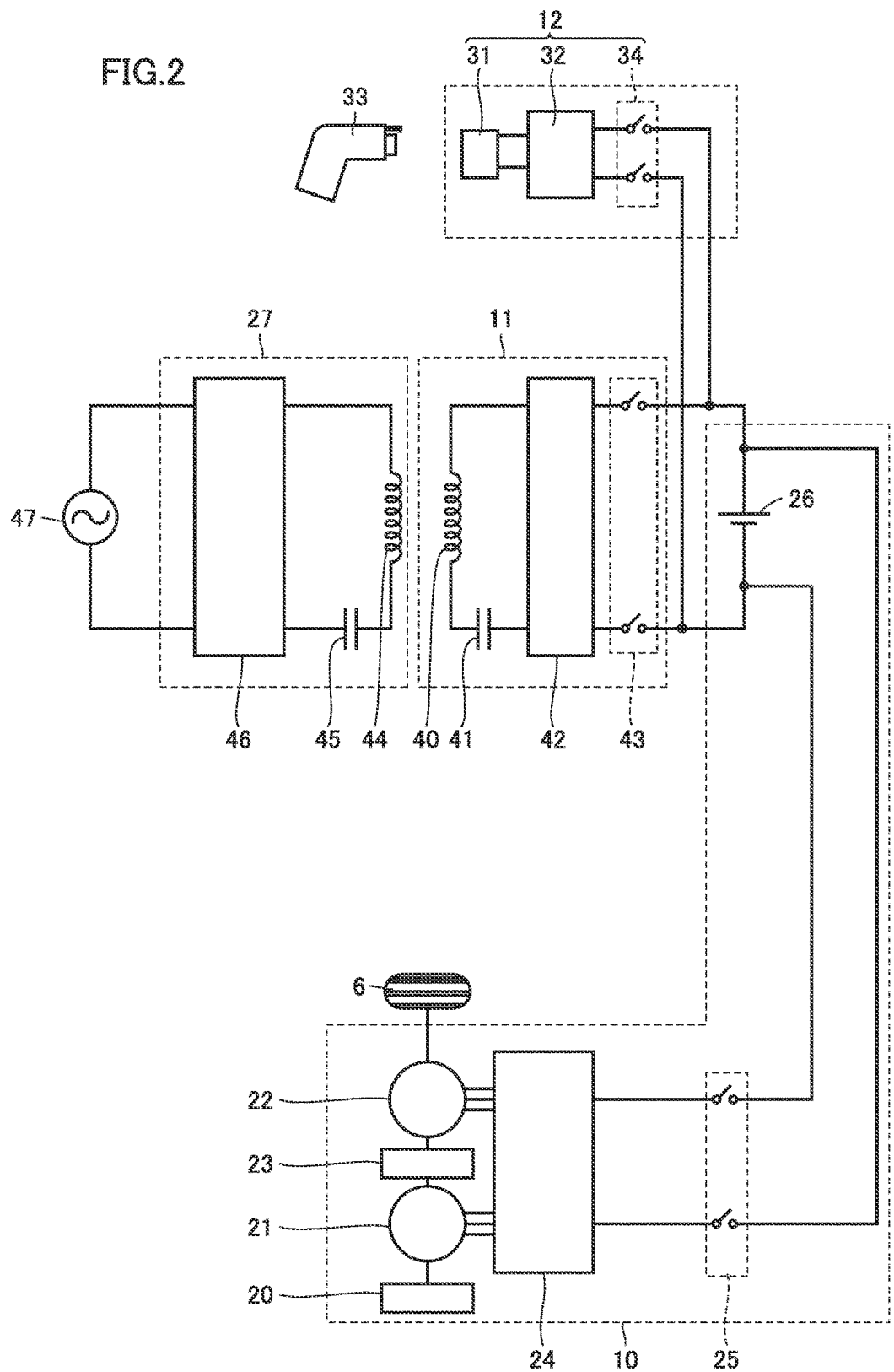

Referring to FIGS. 1 to 26, an electrically powered vehicle according to the present embodiment will be hereinafter described. In addition, among the configurations shown in FIGS. 1 to 26, the same configurations or substantially the same configurations are designated by the same reference characters, and description thereof may not be repeated.

In FIG. 1 and the like, "U" indicates the upside direction, and "D" indicates the downside direction. "L" indicates the left side of the vehicle, and "R" indicates the right side of the vehicle. "F" indicates the front side of the vehicle, and "B" indicates the rear side of the vehicle.

FIG. 1 is a schematic diagram showing an electrically powered vehicle 1. As shown in this FIG. 1, electrically powered vehicle 1 is provided on its inside with an engine compartment 2, a passenger compartment 3, and a luggage compartment 4.

Engine compartment 2 is provided in the front-side area of electrically powered vehicle 1, and equipped with various devices such as an engine 20. Passenger compartment 3 is disposed rearward of engine compartment 2 and provided as a space in which passengers are accommodated. Luggage compartment 4 is disposed rearward of passenger compartment 3, and provided as a space in which luggage and the like are housed.

Electrically powered vehicle 1 includes: a floor panel 5 forming the bottom surface of electrically powered vehicle 1; a pair of front wheels 6; and a pair of rear wheels 7. Floor panel 5 forms the bottom surface of passenger compartment 3 and the bottom surface of luggage compartment 4.

Electrically powered vehicle 1 includes a drive device 10, a power reception device 11, a charging device 12, and a fuel tank 13.

Drive device 10 includes an engine 20, rotating electric machines 21 and 22, a power split device 23, a power control unit (PCU) 24, and a battery 26.

Engine 20, rotating electric machines 21 and 22, power split device 23, and PCU 24 are arranged inside engine compartment 2.

Battery 26 is fixed to a lower surface 75 of floor panel 5. Battery 26 is disposed between front wheels 6 and rear wheels 7 in the front-rear direction of electrically powered vehicle 1.

Fuel tank 13 is disposed rearward of battery 26 and fixed to lower surface 75 of floor panel 5. At least a part of fuel tank 13 is located between two rear wheels 7.

Power reception device 11 is fixed to a lower surface 74 of battery 26. Power reception device 11 is configured to contactlessly receive electric power from power transmission device 27 provided on the ground or the like.

Charging device 12 includes a cover 30, an inlet body (charging unit) 31, and a rectifier 32. Cover 30 and inlet body 31 are provided on the side surface of electrically powered vehicle 1 and located above floor panel 5. When the user opens cover 30, inlet body 31 is exposed to the outside. A charging connector (charging plug) 33 provided externally to electrically powered vehicle 1 can be connected to inlet body 31. Rectifier 32 is disposed on the upper surface of floor panel 5, and in the example shown in FIG. 1, arranged inside luggage compartment 4.

FIG. 2 is a block diagram schematically showing drive device 10, power reception device 11, charging device 12, and the like.

As shown in FIG. 2, drive device 10 includes a system main relay (SMR) 25 connected to battery 26, and PCU 24 is connected to this SMR 25. When SMR 25 is closed, PCU 24 and battery 26 are electrically connected to each other. When electrically powered vehicle 1 travels, the electric power stored in battery 26 is supplied to rotating electric machine 22 through PCU 24, and the motive power of rotating electric machine 22 is transmitted to front wheels 6. In addition, power split device 23 transmits the motive power, which is received from engine 20, to rotating electric machine 21 and front wheels 6.

Charging device 12 includes a rectifier 32 and a charging relay 34 that is connected to battery 26. When charging relay 34 is closed, rectifier 32 and battery 26 are electrically connected to each other. In addition, charging connector 33 is connected to a power supply that is not shown. When battery 26 is to be charged using charging device 12, charging connector 33 is connected to inlet body 31 and charging relay 34 is closed. Then, alternating-current (AC) power is supplied from charging connector 33 to inlet body 31. Rectifier 32 converts the supplied AC power into direct-current (DC) power, and supplies the converted power to battery 26. In addition, when battery 26 is charged using charging device 12, SMR 25 is opened.

Power reception device 11 includes a power reception coil 40, a capacitor 41, a rectifier 42, and a charging relay 43. Capacitor 41 is connected in series to power reception coil 40. Rectifier 42 is connected to power reception coil 40 and capacitor 41. Charging relay 43 is connected to battery 26 and rectifier 42. Thus, when charging relay 43 is closed, rectifier 42 and battery 26 are electrically connected to each other.

Power transmission device 27 includes a power transmission coil 44, a capacitor 45, and a converter 46. Capacitor 45 is connected in series to power transmission coil 44. Converter 46 is connected to power transmission coil 44 and capacitor 45. Converter 46 is connected to a power supply 47.

When battery 26 is charged using power reception device 11, charging relay 43 is closed. Then, AC power is supplied from power supply 47 to converter 46. Converter 46 adjusts the frequency and the voltage of the AC power supplied from power supply 47, and supplies the adjusted AC power to power transmission coil 44. When an alternating current flows through power transmission coil 44, an electromagnetic field is formed around power transmission coil 44. Power reception coil 40 receives electric power through the electromagnetic field formed around power transmission coil 44, and supplies the received AC power to rectifier 42. Rectifier 42 converts the AC power into DC power, and supplies the converted power to battery 26. In addition, when battery 26 is charged using power reception device 11, SMR 25 is opened.

FIG. 3 is a front view showing electrically powered vehicle 1. As shown in FIG. 3, lower surface 76 of power reception device 11 is located below lower surface 74 of battery 26. Lower surface 77 of fuel tank 13 is located above lower surface 76 of power reception device 11. In the example shown in this FIG. 3, lower surface 77 of fuel tank 13 is located above lower surface 74 of battery 26 and lower surface 76 of power reception device 11.

Figure 4:
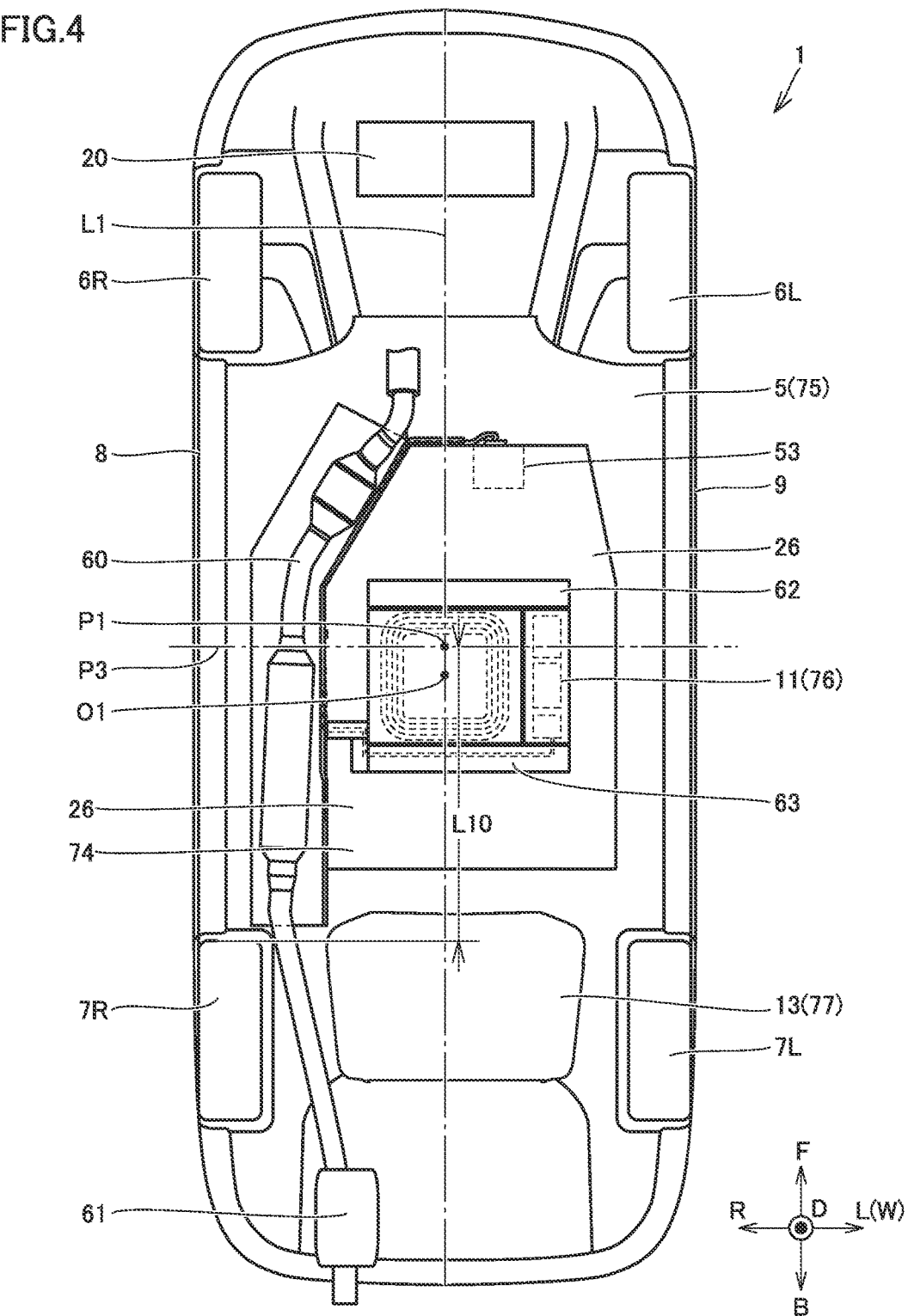
FIG. 4 is a bottom view of the electrically powered vehicle as seen from below.

FIG. 4 is a bottom view of electrically powered vehicle 1 as seen from below. In FIG. 4, "L1" indicates an imaginary straight line passing through the center of electrically powered vehicle 1 in a width direction W and also extending in the front-rear direction of electrically powered vehicle 1. "P3" indicates an intermediate plane passing through the intermediate position between a left front wheel 6L and a left rear wheel 7L, and through the intermediate position between a right front wheel 6R and a right rear wheel 7R, as a flat plane extending in the up-down direction. Also, "P1" indicates an intersection point of an imaginary straight line L1 and an intermediate plane P3.

As shown in this FIG. 4, in a plan view of electrically powered vehicle 1 seen from therebelow, battery 26 is arranged so as to be overlaid on intersection point P1.

Battery 26 is formed in an elongated shape in the front-rear direction of electrically powered vehicle 1. In the example shown in this FIG. 3, in the front-rear direction of electrically powered vehicle 1, the length of battery 26 is longer than a distance L10 between rear wheel 7 and intermediate plane P3.

In width direction W of electrically powered vehicle 1, battery 26 is arranged so as to be located closer to a left side surface 9 of electrically powered vehicle 1 than to a right side surface 8 thereof. Therefore, in width direction W of electrically powered vehicle 1, the space on the right side of battery 26 is larger than the space on the left side of battery 26.

Furthermore, an exhaust tube 60 is disposed on the right side of battery 26. Exhaust tube 60 has a front end connected to engine 20 and a rear end connected to a muffler 61.

When power reception device 11 and battery 26 are seen in plan view from the position downwardly away from power reception device 11 and battery 26, power reception device 11 is located within an area of lower surface 74 of battery 26 and disposed so as to be overlaid on intersection point P1.

Figure 5:
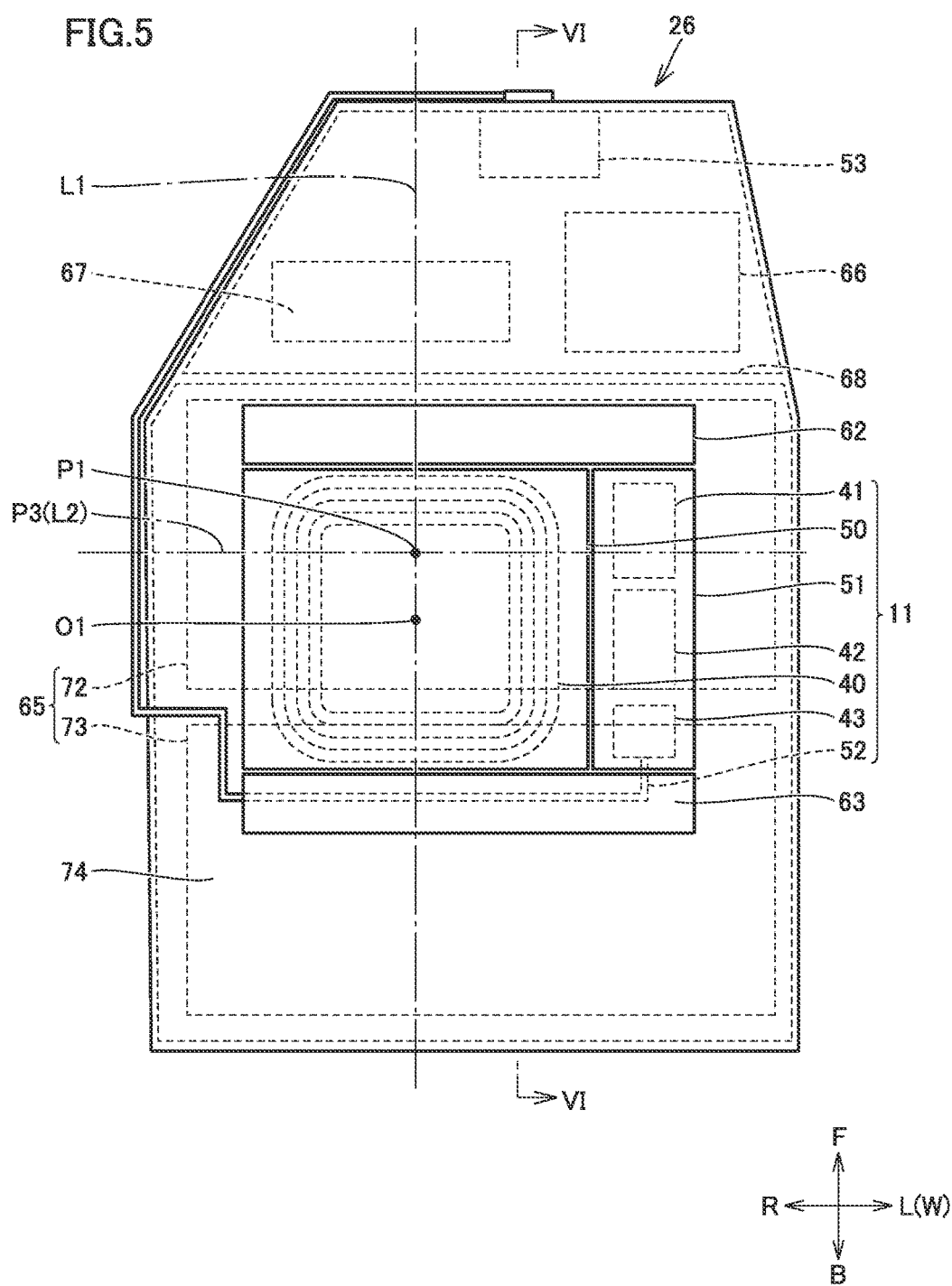
FIG. 5 is a plan view of a battery and the power reception device as seen from below.

FIG. 5 is a plan view of battery 26 and power reception device 11 as seen from below. As shown in this FIG. 5, power reception device 11 includes a coil case 50 and an equipment case 51. Equipment case 51 is disposed so as to be adjacent to coil case 50 in width direction W of electrically powered vehicle 1. In the example shown in this FIG. 3, equipment case 51 is disposed on the left side of coil case 50.

Equipment case 51 houses a capacitor 41, a rectifier 42, and a charging relay 43. Equipment case 51 is made of a metal material, for example, aluminum or the like. A charging cable 52 is routed from the rear end portion of equipment case 51. Charging cable 52 extends from the rear end portion of equipment case 51 toward the right side surface of battery 26. Then, charging cable 52 extends along the right side surface of battery 26, and is connected to a connector 53 provided at the front end of battery 26.

Coil case 50 houses power reception coil 40. In addition, the bottom plate of coil case 50 is made of a resin material and formed so as to allow a magnetic flux to pass through this bottom plate of coil case 50.

Power reception coil 40 is a spiral-type coil formed in a planar shape. Power reception coil 40 is formed so as to surround a winding center line O1 extending in the up-down direction.

In a plan view of electrically powered vehicle 1 seen from below, power reception device 11 is disposed such that winding center line O1 of power reception coil 40 is located on imaginary straight line L1.

On lower surface 74 of battery 26, a protection member 62 and a protection member 63 are arranged. Protection member 62 is disposed in the front-side area of electrically powered vehicle 1 with respect to power reception device 11 while protection member 63 is disposed in the rear-side area of electrically powered vehicle 1 with respect to power reception device 11. Protection members 62 and 63 each are formed so as to be hollow. Also, charging cable 52 is disposed inside protection member 63.

Figure 6:
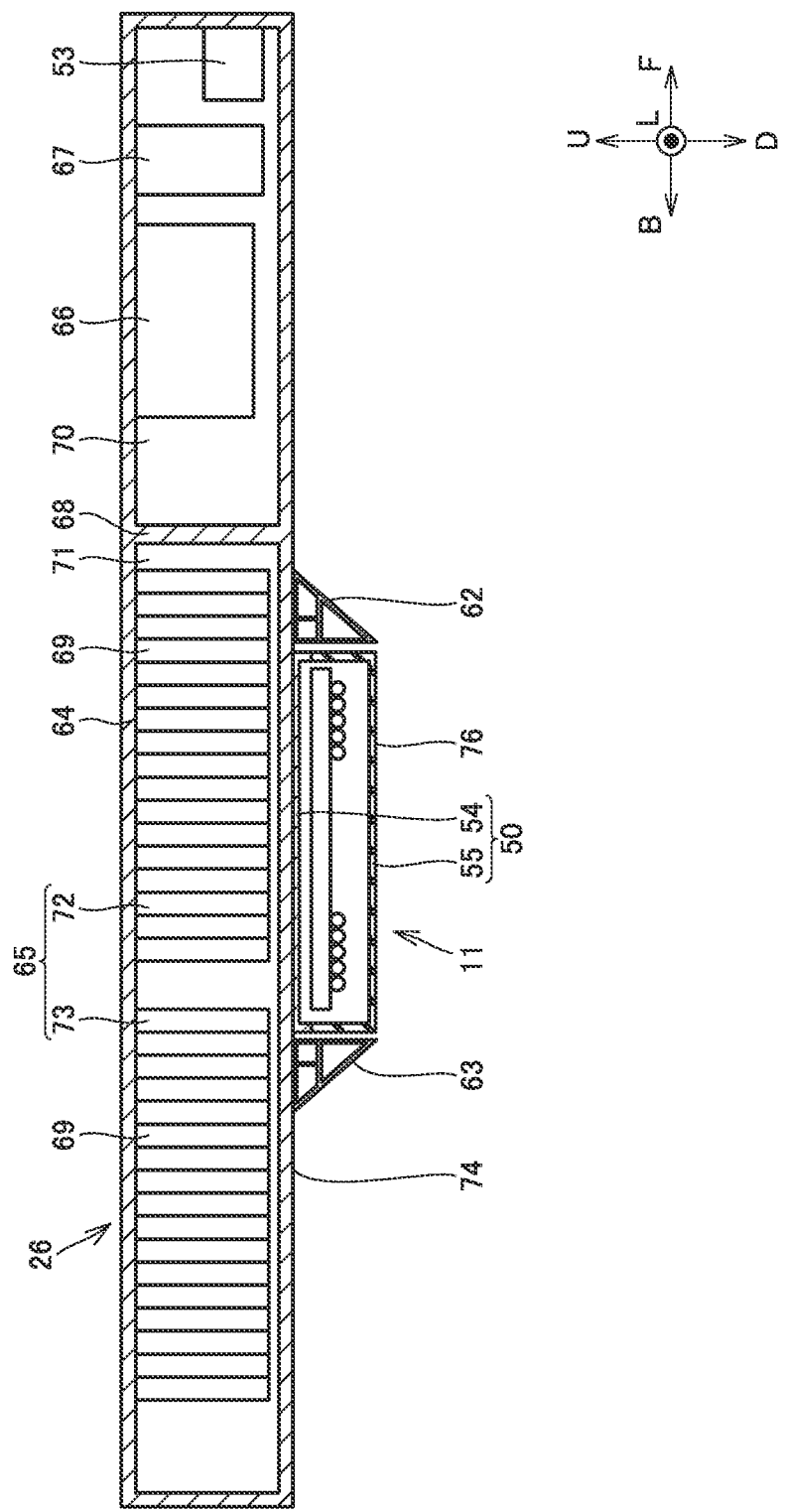
FIG. 6 is a cross-sectional view taken along a line VI-VI in FIG. 5.

FIG. 6 is a cross-sectional view taken along a line VI-VI in FIG. 5. As shown in this FIG. 6, battery 26 includes a case 64, a battery body 65, a battery ECU 66, a connector 53, and equipment 67.

Case 64 is made of metal, and for example, made of aluminum or an aluminum alloy. Inside the case 64, a partition wall 68 is arranged for dividing the space inside the case 64 into a housing chamber 70 and a housing chamber 71. Housing chamber 71 is disposed rearward of housing chamber 70.

Battery ECU 66, connector 53 and equipment 67 are housed in housing chamber 70. Battery body 65 is housed in housing chamber 71. Battery body 65 includes a plurality of battery modules 72 and 73. Battery modules 72 and 73 are disposed so as to be arranged in the front-rear direction. Each of battery modules 72 and 73 includes a plurality of battery cells 69.

Coil case 50 of power reception device 11 includes a top plate 54 and a resin cover 55 disposed on the lower surface side of top plate 54. The upper surface of top plate 54 is in contact with lower surface 74 of case 64. Top plate 54 may be, for example, made of metal such as aluminum or an aluminum alloy, or may be made of resin or the like.

Protection member 62 is disposed forward of power reception device 11. Protection member 62 is formed so as to be inclined downwardly from the front-side area of electrically powered vehicle 1 toward power reception device 11. Protection member 63 is disposed rearward of power reception device 11. Protection member 63 is formed so as to be inclined downwardly from the rear-side area of electrically powered vehicle 1 toward power reception device 11. Each of protection members 62 and 63 is made of aluminum or an aluminum alloy.

Protection member 62 is located slightly rearward of partition wall 68, and disposed below battery module 72.

Power reception device 11 is disposed so as to overlap with each of battery module 72 and battery module 73 in the up-down direction.

The area in which power reception device 11 and battery module 72 overlap with each other in the up-down direction is larger than the area in which power reception device 11 and battery module 73 overlap with each other in the up-down direction. Protection member 63 and battery module 73 are disposed so as to overlap with each other in the up-down direction.

Figure 7:
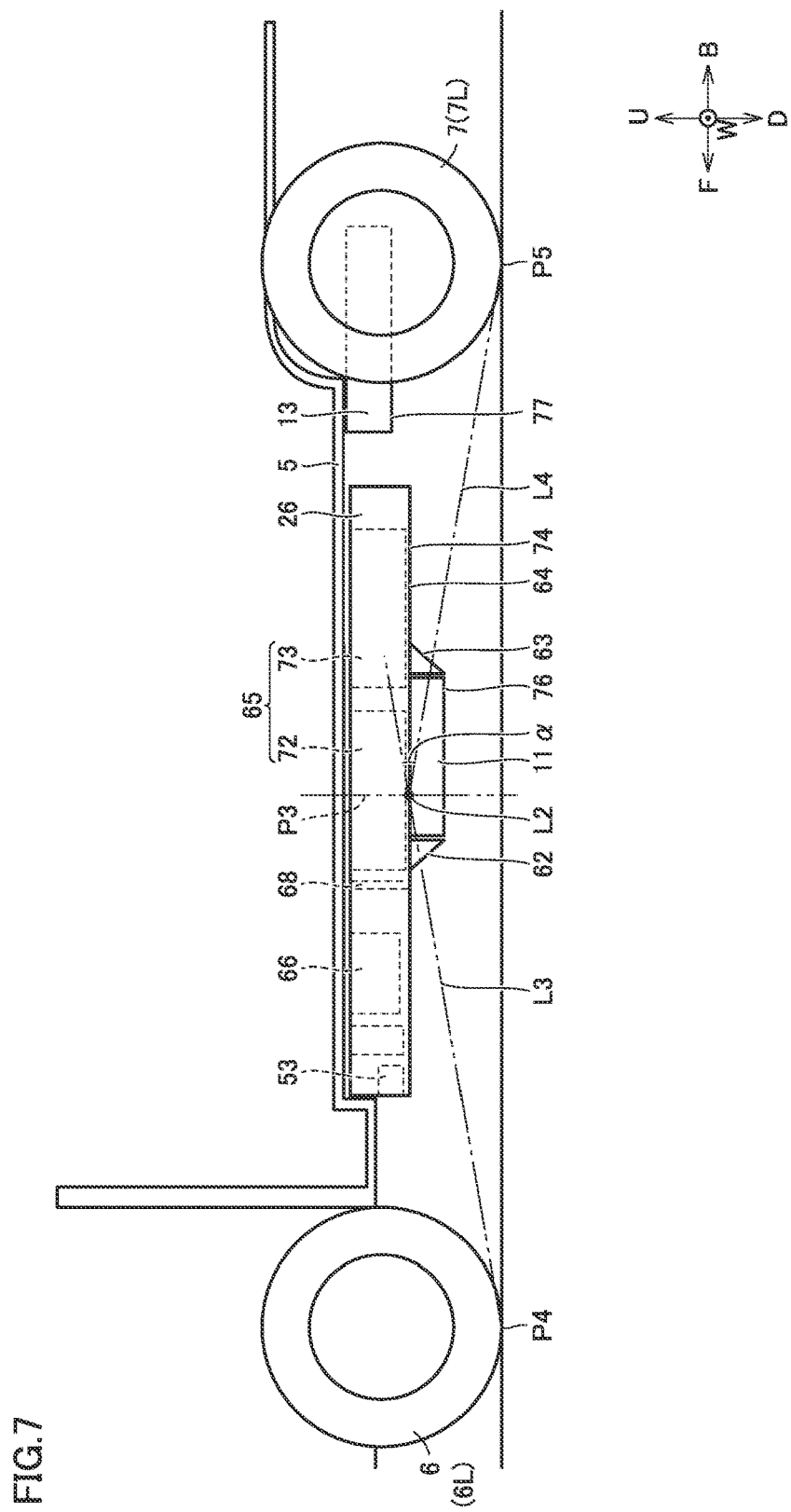
FIG. 7 is a side view illustrating a ramp breakover angle assuming that a lower surface of a case is defined as the minimum ground clearance.

FIG. 7 is a side view illustrating a ramp breakover angle assuming that lower surface 74 of case 64 is defined as the minimum ground clearance. As shown in this FIG. 7, lower surface 74 of case 64 is a flat surface. In this FIG. 7, "L2" indicates an imaginary straight line defined on lower surface 74 of battery 26, passing along the intermediate position between front wheels 6 and rear wheels 7, and extending in width direction W of electrically powered vehicle 1. Geometrically, "L2" is an intersection line of lower surface 74 of battery 26 and intermediate plane P3. In this case, "α" indicates a ramp breakover angle assuming that lower surface 74 of case 64 is defined as the minimum ground clearance.

Ramp breakover angle α shows an angle formed by an imaginary straight line L3 and an imaginary straight line L4 as seen in side view of electrically powered vehicle 1. Imaginary straight line L3 is an imaginary line that passes through a ground contact point P4 of front wheel 6 and a center imaginary line L2. Imaginary straight line L4 is an imaginary straight line that passes through a ground contact point P5 of rear wheel 7 and center imaginary line L2. Power reception device 11 is disposed at a position of lower surface 74 along which center imaginary line L2 passes, so as to protrude downward from lower surface 74.

Figure 8:
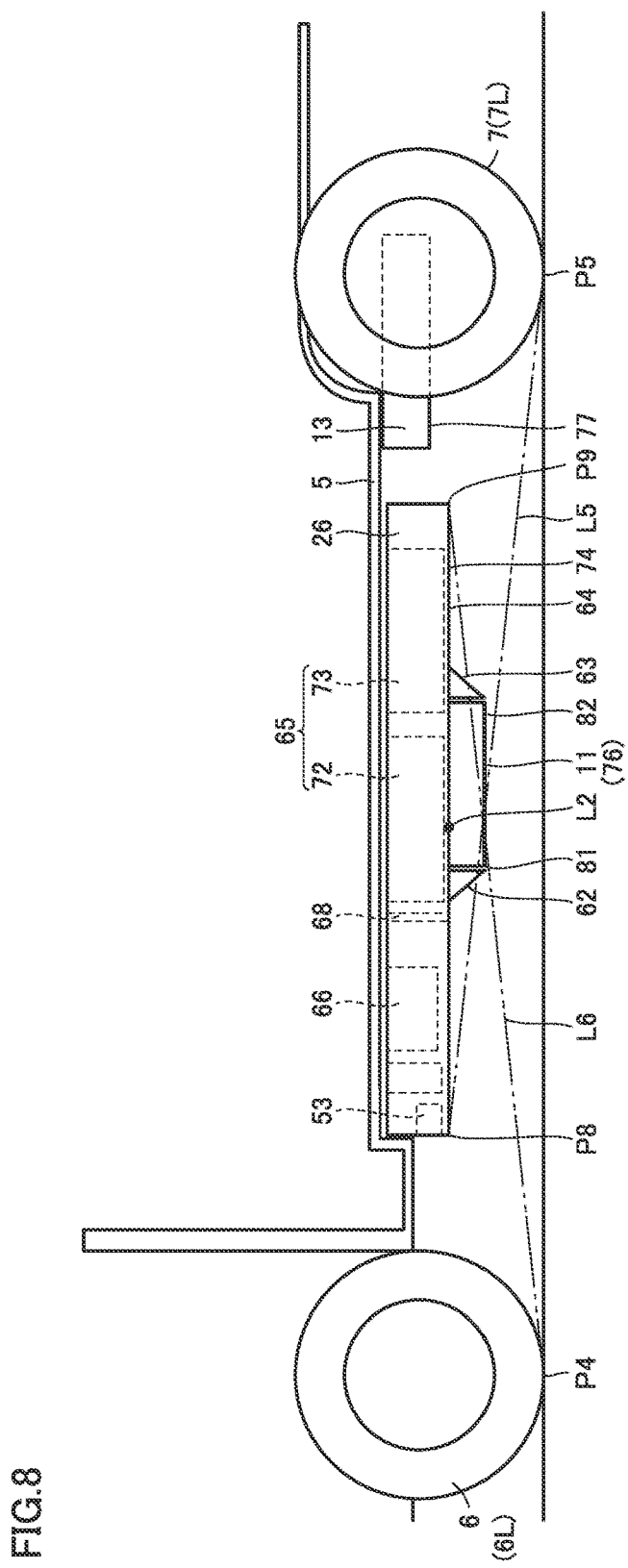
FIG. 8 is a side view illustrating a position at which the power reception device is mounted.

FIG. 8 is a side view illustrating a position at which power reception device 11 is mounted. In this FIG. 8 showing electrically powered vehicle 1 as seen in side view, "L5" indicates an imaginary straight line passing through a ground contact point P5 of rear wheel 7 and a front end portion P8 of lower surface 74. "L6" indicates an imaginary straight line passing through a ground contact point P4 of front wheel 6 and a rear end portion P9 of lower surface 74.

Power reception device 11 includes: a lower portion 81 located below imaginary straight line L5; and a lower portion 82 located below imaginary straight line L6. In addition, the lower end of protection member 62 is located below imaginary straight line L5, and the lower end of protection member 63 is located below imaginary straight line L6.

Figure 9:
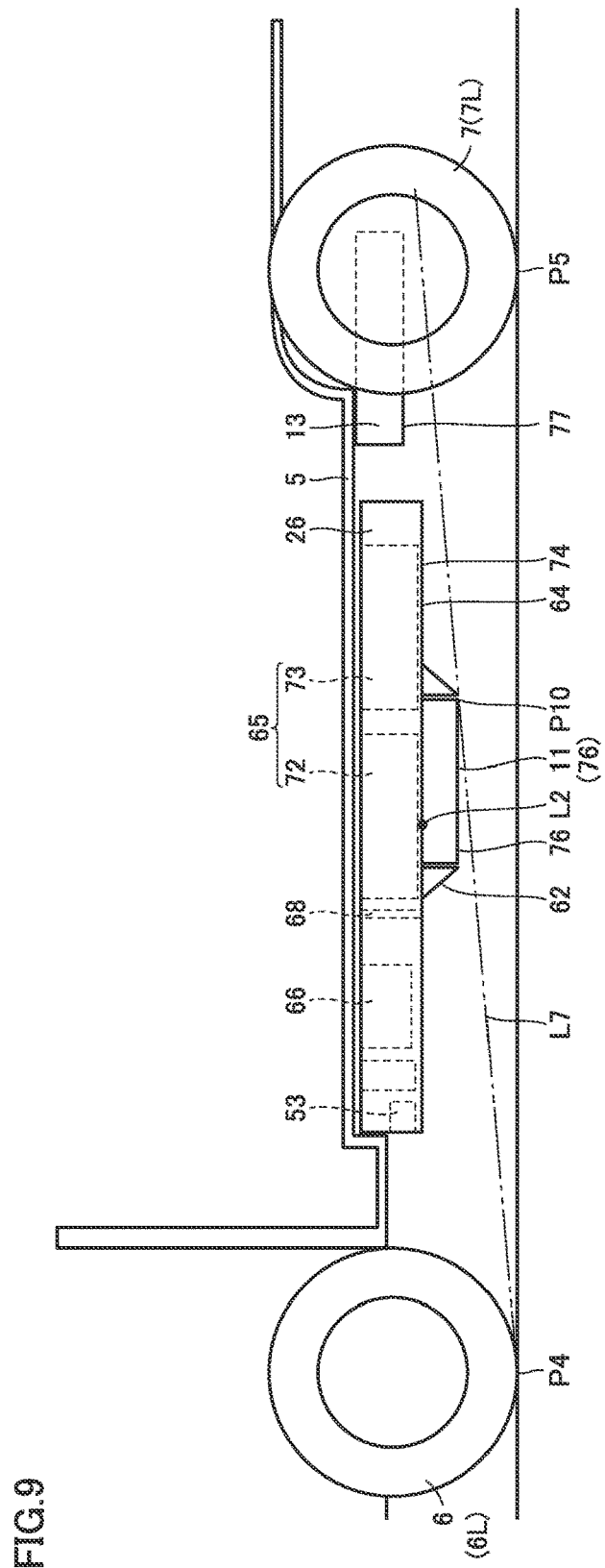
FIG. 9 is a side view illustrating a position at which a fuel tank is mounted.
Figure 10:
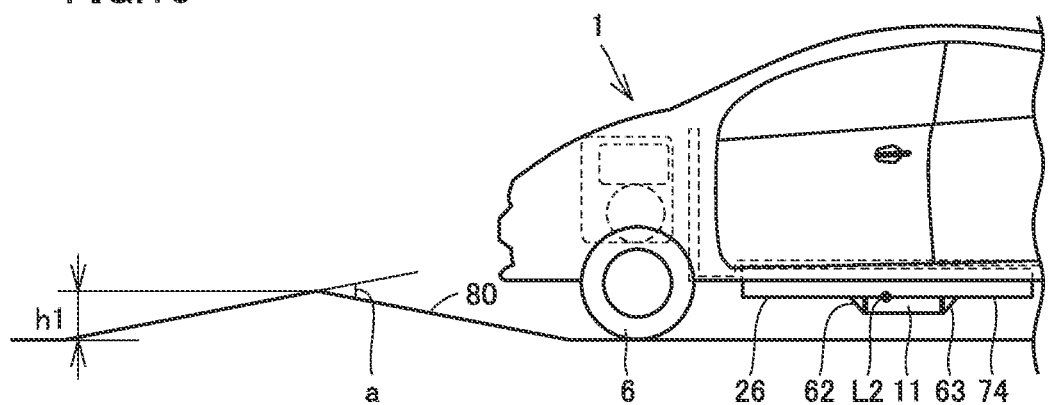
FIG. 10 is a side view showing the state where the electrically powered vehicle is approaching a bump.

FIG. 9 is a side view illustrating a position at which fuel tank 13 is mounted. In this FIG. 9 showing electrically powered vehicle 1 as seen in side view, "L7" indicates an imaginary straight line passing through ground contact point P4 of front wheel 6 and a rear end portion P10 on lower surface 76 of power reception device 11. Also, lower surface 77 of fuel tank 13 is located above imaginary straight line L7.

The following is an explanation about the case where electrically powered vehicle 1 configured as described above travels on one of roads having various kinds of surfaces. FIGS. 10 to 13 each are a schematic diagram for illustrating the state where electrically powered vehicle 1 travels on a road having a surface on which a bump 80 is formed. Bump 80 formed on the road surface has: an apex angle a that is the same as a ramp breakover angle α; and a height h1 that is slightly higher than the height of lower surface 74 of battery 26.

Figure 11:
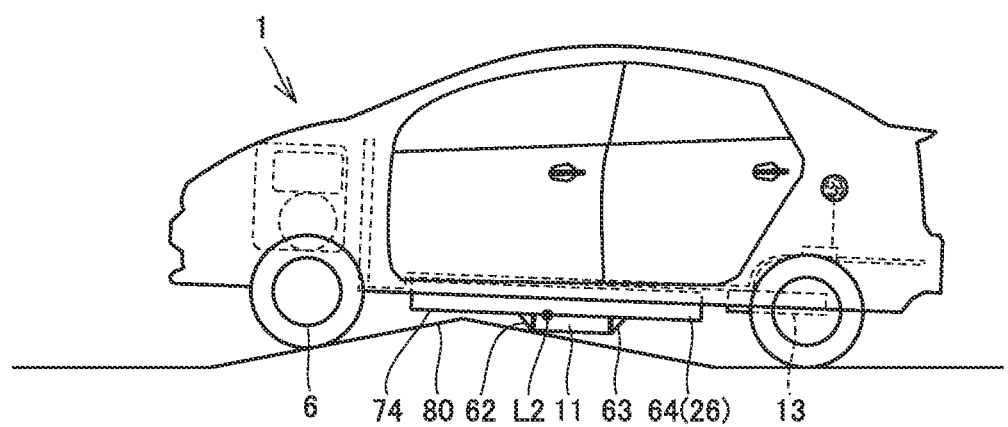
FIG. 11 is a side view showing the state where front wheels have moved beyond the top portion of the bump.

As shown in FIG. 11, when front wheels 6 move beyond the top point of bump 80, lower surface 74 of battery 26 starts to approach the top point of bump 80.

Figure 13:
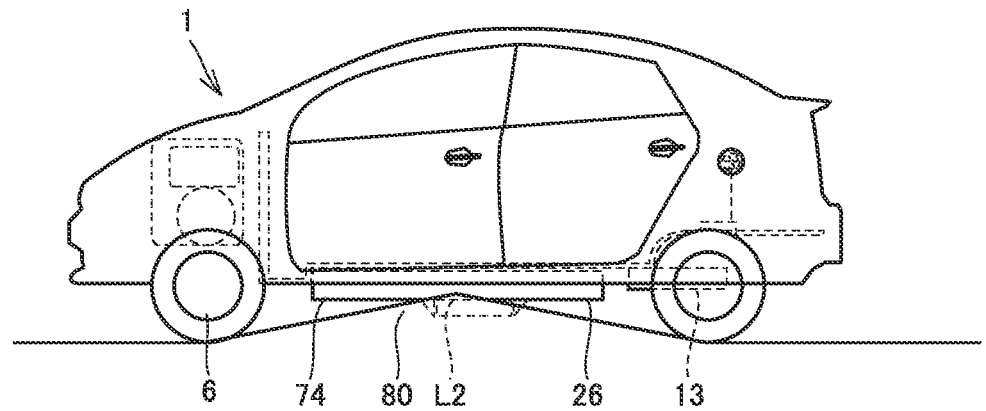
FIG. 13 is a side view showing the state where a battery of an electrically powered vehicle having no power reception device contacts the bump.

If power reception device 11 is not provided on lower surface 74 of battery 26, the top portion of bump 80 contacts battery 26 as shown in FIG. 13, which may cause damage to battery 26. Specifically, the top portion of bump 80 contacts a portion of lower surface 74 at which center imaginary line L2 is located.

On the other hand, in electrically powered vehicle 1 according to the present embodiment, power reception device 11 is disposed on lower surface 74 of battery 26. Accordingly, power reception device 11 contacts bump 80 before battery 26 contacts bump 80, so that battery 26 is protected. This will be hereinafter specifically described with reference to FIGS. 11 and 12.

FIG. 11 is a side view showing the state where front wheels 6 have moved beyond the top portion of bump 80. As shown in FIG. 11, protection member 62 contacts bump 80 before battery 26 contacts bump 80. This is because the lower end of protection member 62 is located below imaginary straight line L5 shown in FIG. 8.

In addition, since protection member 62 is disposed forward of power reception device 11, protection member 62 contacts bump 80 before power reception device 11 contacts bump 80.

Figure 12:
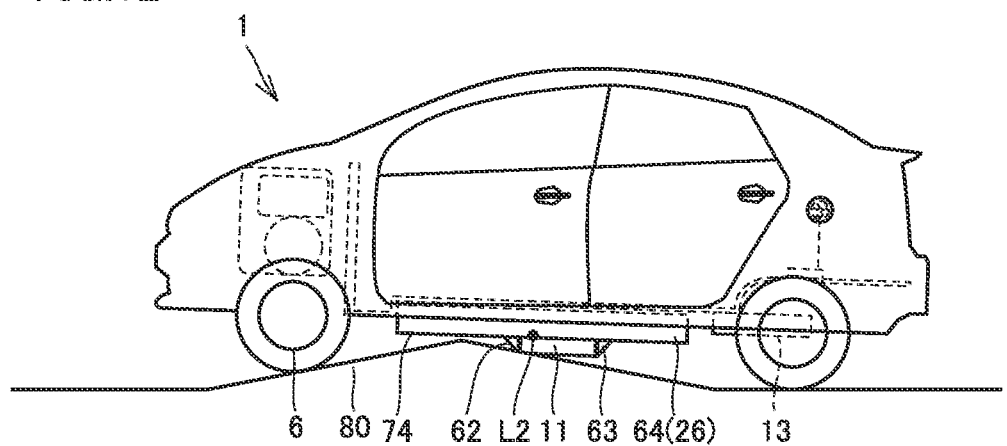
FIG. 12 is a side view showing the state where the electrically powered vehicle moves forward from the state shown in FIG. 11.

FIG. 12 is a side view showing the state where electrically powered vehicle 1 moves forward from the state shown in FIG. 11. As shown in this FIG. 12, power reception device 11 contacts bump 80 before battery 26 contacts bump 80. This is because power reception device 11 includes lower portion 81 located below imaginary straight line L5 shown in FIG. 8. In this way, according to electrically powered vehicle 1 of the present embodiment, battery 26 is protected by power reception device 11 and protection member 62. Furthermore, protection member 62 contacts bump 80 before power reception device 11 contacts bump 80, so that power reception device 11 is also protected by protection member 62.

When electrically powered vehicle 1 moves backward to bump 80, protection member 63 and power reception device 11 contact bump 80 before battery 26 contacts bump 80.

In this way, even if electrically powered vehicle 1 moves forward and backward to bump 80, damage to battery 26 can be suppressed.

In this case, when electrically powered vehicle 1 moves forward or backward to bump 80, the top portion of bump 80 approaches center imaginary line L2 on lower surface 74 of battery 26. In FIG. 5, coil case 50 and equipment case 51 are located to overlap with center imaginary line L2 in the up-down direction and arranged in the direction in which center imaginary line L2 extends (width direction W of electrically powered vehicle 1). Accordingly, a portion of lower surface 74 where center imaginary line L2 is located and its surrounding portion are mostly covered by coil case 50 and equipment case 51. Therefore, contact between the top portion of bump 80 and lower surface 74 can be suppressed.

Since battery modules 72 and 73 are disposed above protection members 62, 63 and power reception device 11, any one of protection members 62, 63 and power reception device 11 contacts bump 80 before battery modules 72, 73 contact bump 80. Battery modules 72 and 73 are higher in voltage than battery ECU 66. Thus, in the present embodiment, by using power reception device 11 and the like, battery modules 72 and 73 of high voltage are protected more than battery ECU 66 and the like.

When substances such as rocks or packages are placed on a road on which electrically powered vehicle 1 is travelling, the front end portion of battery 26 hits such substances. In this case, since connector 53, battery ECU 66 and equipment 67 are disposed forward of battery body 65, such connector 53 and the like function as a crushable zone, so that application of strong impact force onto battery body 65 can be suppressed.

Then, referring to FIGS. 14 to 18, an explanation will be hereinafter given with regard to the case where electrically powered vehicle 1 travels on the road on which a stepped portion 83 is formed. Stepped portion 83 has a height h2 that is slightly higher than the height of lower surface 74 of case 64 from the road surface.

Figure 14:
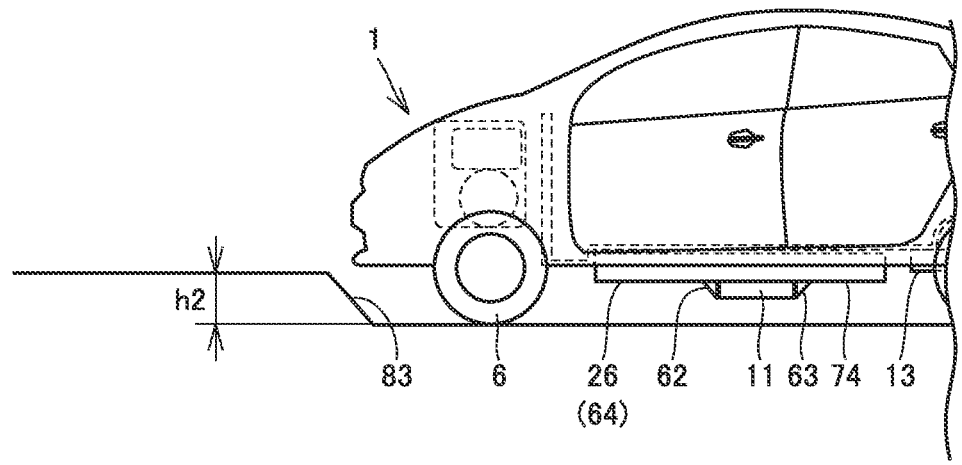
FIG. 14 is a side view showing the state where the electrically powered vehicle is approaching a stepped portion.

From the state shown in FIG. 14, electrically powered vehicle 1 approaches stepped portion 83, and then, front wheels 6 move beyond stepped portion 83.

Figure 15:
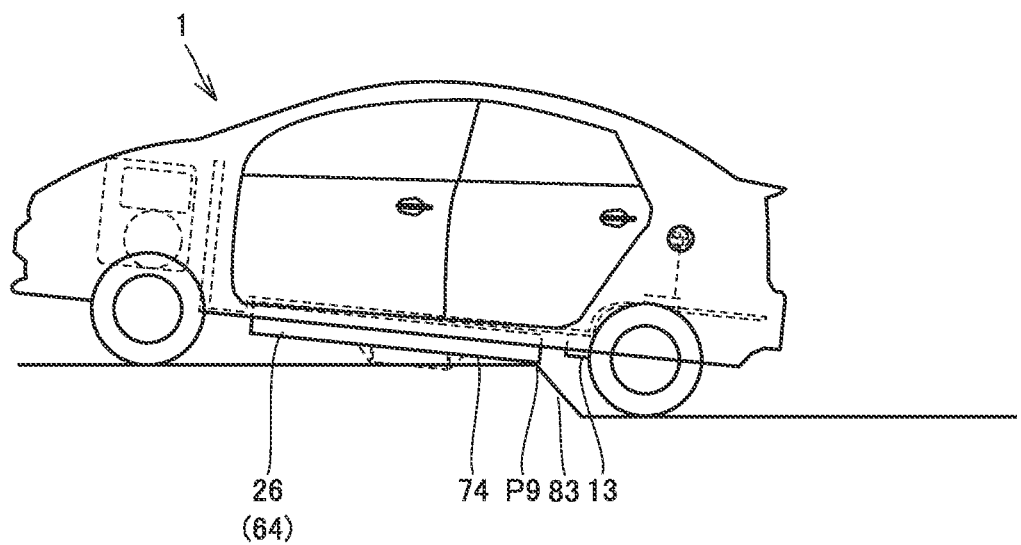
FIG. 15 is a side view showing the state where the battery of the electrically powered vehicle having no power reception device contacts the stepped portion.

If power reception device 11 and the like are not provided, battery 26 comes in contact, at or around rear end portion P9 thereof, with stepped portion 83 as shown in FIG. 15.

Figure 16:
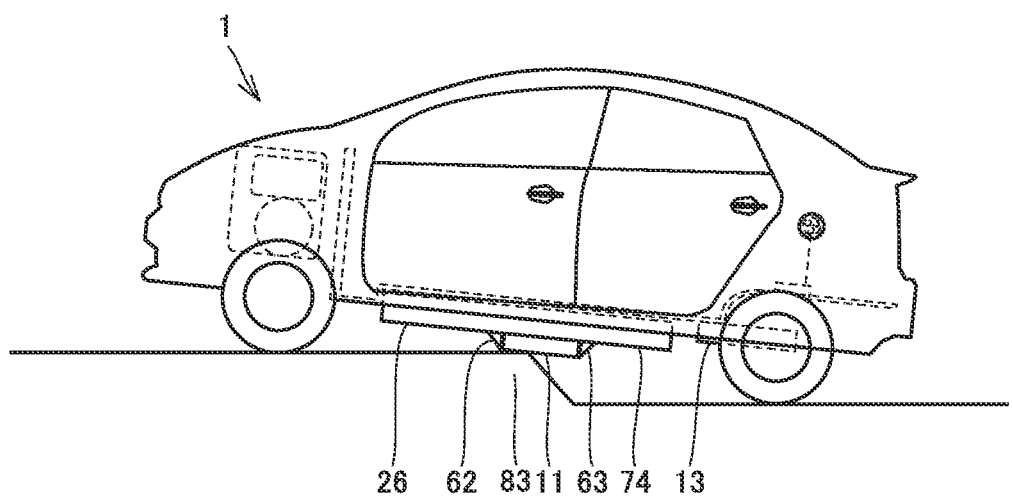
FIG. 16 is a side view showing the state where the power reception device contacts the stepped portion.

On the other hand, as shown in FIG. 16, since electrically powered vehicle 1 is equipped with power reception device 11 on lower surface 74 of battery 26, power reception device 11 contacts stepped portion 83 before battery 26 contacts stepped portion 83, so that battery 26 can be protected. This will be hereinafter specifically described with reference to FIG. 17.

Figure 17:
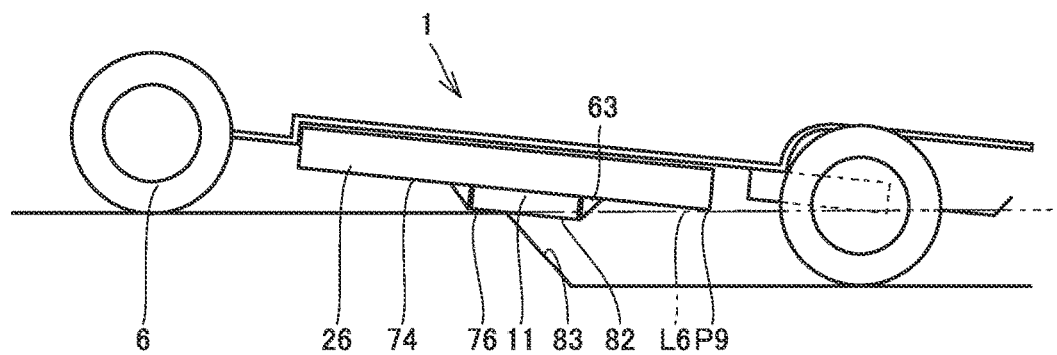
FIG. 17 is a side view showing the power reception device and the configuration around this power reception device in the state shown in FIG. 16.

FIG. 17 is a side view showing power reception device 11 and the configuration around this power reception device 11 in the state shown in FIG. 16. As shown in this FIG. 17, power reception device 11 has lower portion 82 located below imaginary straight line L6. Thus, lower portion 82 of power reception device 11 contacts stepped portion 83 before stepped portion 83 contacts battery 26.

In this way, also when electrically powered vehicle 1 climbs up stepped portion 83, battery 26 is protected by power reception device 11 and the like.

Figure 18:
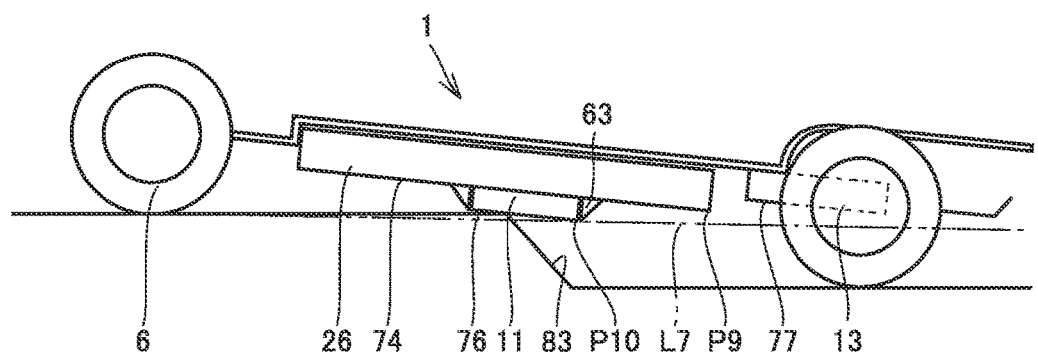
FIG. 18 is a side view showing the positional relation between the power reception device and the fuel tank in the state shown in FIG. 16.
Figure 19:
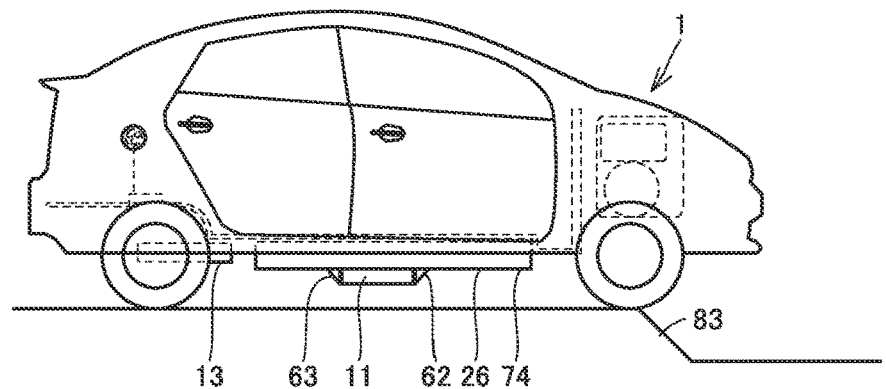
FIG. 19 is a side view showing the state where the electrically powered vehicle is approaching the stepped portion.

As shown in FIG. 18, since lower surface 77 of fuel tank 13 is located above imaginary straight line L7, power reception device 11 contacts stepped portion 83 before fuel tank 13 contacts stepped portion 83. When power reception device 11 contacts stepped portion 83, it becomes difficult for electrically powered vehicle 1 to move forward. In addition to this, when a user hears impact sound caused by the contact between power reception device 11 and stepped portion 83, the user may often stop the forward movement of electrically powered vehicle 1. Thereby, contact between fuel tank 13 and stepped portion 83 is suppressed, so that fuel tank 13 is also protected.

Then, referring to FIGS. 19 to 22, an explanation will be hereinafter given with regard to the case where electrically powered vehicle 1 climbs down from stepped portion 83. From the state shown in FIG. 19, electrically powered vehicle 1 starts to climb down from stepped portion 83. Then, battery 26 comes closer to stepped portion 83.

Figure 20:
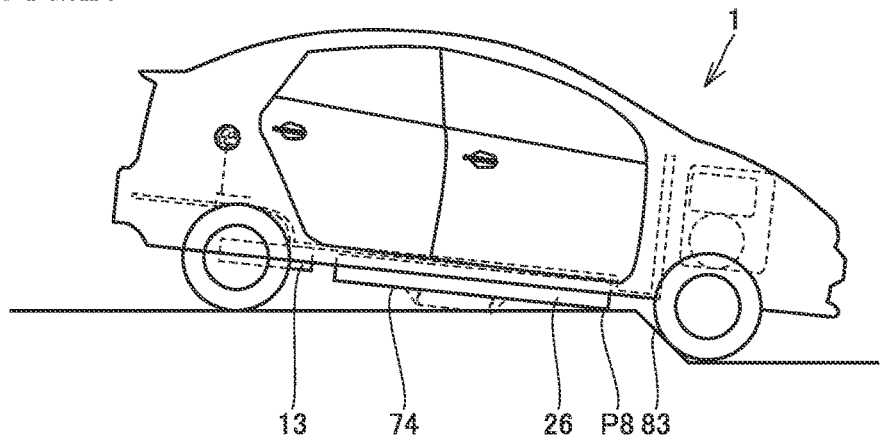
FIG. 20 is a side view showing the state where the battery of the electrically powered vehicle having no power reception device contacts the stepped portion (ground).

If power reception device 11 is not provided on lower surface 74 of battery 26, front end portion P8 of battery 26 contacts the ground as shown in FIG. 20.

Figure 21:
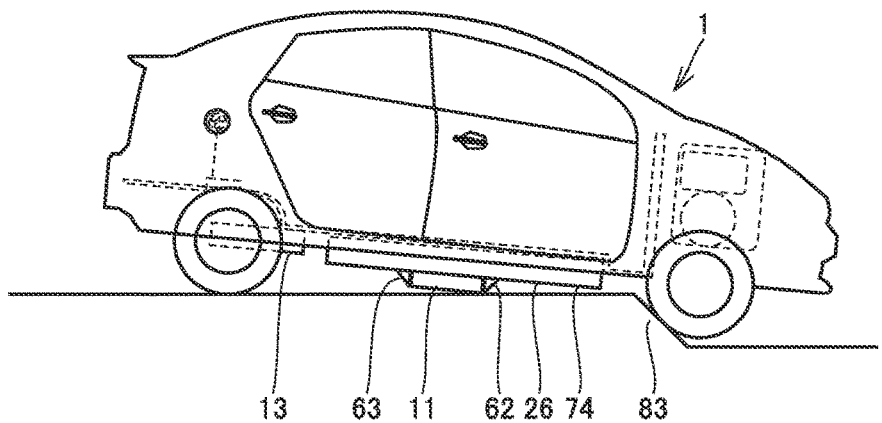
FIG. 21 is a side view showing the state where the power reception device contacts the ground in a course where the electrically powered vehicle moves down from the stepped portion.

On the other hand, in the present embodiment, power reception device 11 is provided on lower surface 74 of battery 26. Accordingly, as shown in FIG. 21, power reception device 11 contacts the ground before battery 26 contacts the ground.

Figure 22:
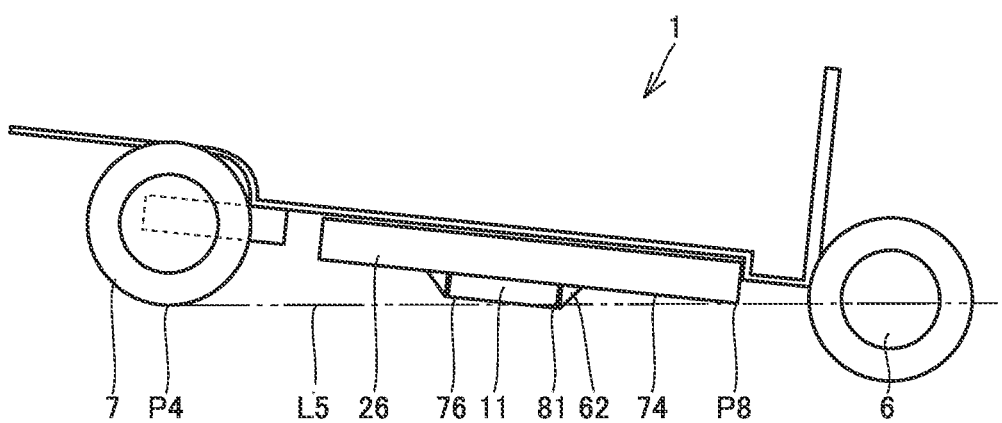
FIG. 22 is a side view showing the relative positional relation among the power reception device, the battery, rear wheels, and the like in the state shown in FIG. 21.

Specifically, as shown in FIG. 22, power reception device 11 includes lower portion 81 located below imaginary straight line L5. Accordingly, lower portion 81 of power reception device 11 contacts the ground before battery 26 contacts the ground. In this way, also when electrically powered vehicle 1 climbs down from stepped portion 83, battery 26 is protected.

Then, referring to FIGS. 23 to 25, an explanation will be hereinafter given with regard to the case where electrically powered vehicle 1 travels on the road on which deep tracks are formed.

Figure 23:
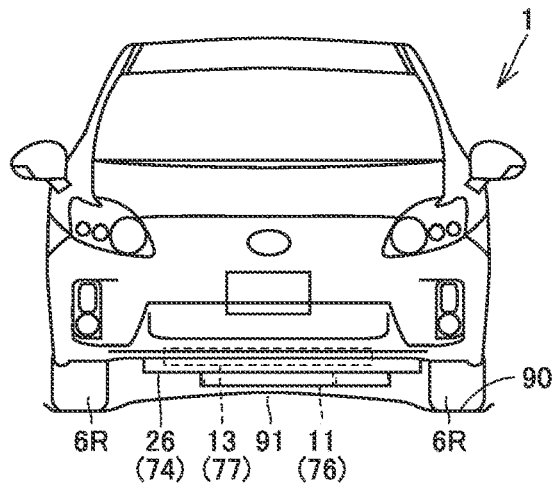
FIG. 23 is a front view showing the state where the electrically powered vehicle starts travelling on tracks.
Figure 24:
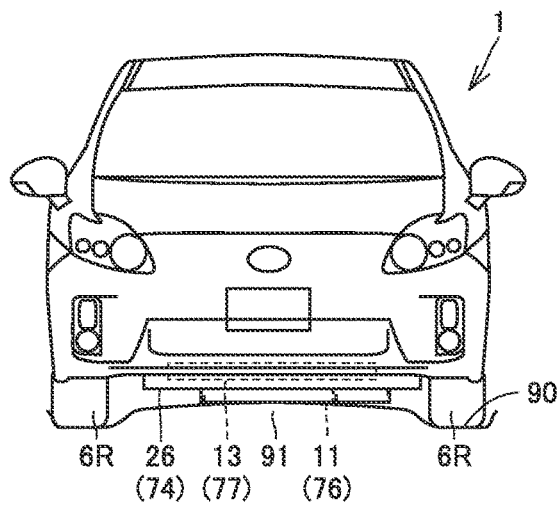
FIG. 24 is a front view showing the state where the power reception device contacts the bump.
Figure 25:
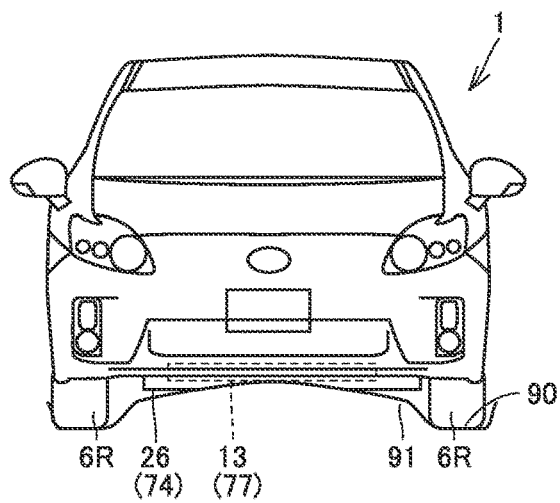
FIG. 25 is a front view showing the state where the battery contacts the bump.

In the example shown in FIGS. 23 to 25, after electrically powered vehicle 1 starts to travel on tracks 90 as shown in FIG. 23, if tracks 90 are increased in depth in accordance with forward movement of electrically powered vehicle 1 as shown in FIGS. 24 and 25, a bump 91 formed between tracks 90 is increased in height.

In this case, if power reception device 11 is not provided on lower surface 74 of battery 26, bump 91 may contact battery 26 and fuel tank 13 as shown in FIG. 25.

On the other hand, in the present embodiment, power reception device 11 is provided on lower surface 74 of battery 26 as shown in FIG. 24. Accordingly, power reception device 11 contacts bump 91 before battery 26 contacts bump 91. Furthermore, since lower surface 77 of fuel tank 13 is located above lower surface 76 of power reception device 11, power reception device 11 contacts bump 91 before fuel tank 13 contacts bump 91. In this way, battery 26 and fuel tank 13 are protected by power reception device 11.

In addition, since lower surface 77 of fuel tank 13 is located above lower surface 74 of battery 26, fuel tank 13 is less likely to contact bump 91 than battery 26 is. If battery 26 is damaged but fuel tank 13 is not damaged, fuel is supplied from fuel tank 13 to engine 20, so that electrically powered vehicle 1 may be able to keep travelling. It is assumed that: the distance that the vehicle can travel with the fuel supplied from fully filled fuel tank 13 is defined as a fuel travelling distance; and the distance that the vehicle can travel with the electric power from fully charged battery 26 is defined as an EV travelling distance. When comparing the fuel travelling distance and the EV travelling distance, the fuel travelling distance is longer than the EV travelling distance. Thus, if damage to fuel tank 13 is avoided, an increased travelling distance can be ensured.

In this way, according to electrically powered vehicle 1 of the present embodiment, even when the vehicle travels on any of roads having various kinds of surfaces, battery 26 can be protected by power reception device 11.

The above description has been made with regard to the case where battery 26 contacts the ground as an example of cause of damage occurring in battery 26. However, for example, there may be a case where battery 26 is hit by flying substances such as small stones struck by front wheels 6 during travelling of electrically powered vehicle 1. On the other hand, in electrically powered vehicle 1 according to the present embodiment, power reception device 11 is provided on lower surface 74 of battery 26, so that substances such as small stones are more likely to hit power reception device 11 before such substances hit battery 26. In this way, in the above-described electrically powered vehicle 1, battery 26 is protected also from flying substances struck by front wheels 6 and the like.

Furthermore, fuel tank 13 is disposed rearward of power reception device 11 while lower surface 77 of fuel tank 13 is located above lower surface 76 of power reception device 11. Therefore, substances such as small stones are more likely to hit power reception device 11 and battery 26 than to hit fuel tank 13, so that fuel tank 13 is protected.

In FIG. 21, as described above, when power reception device 11 is brought into contact with the ground or hit by small stones and the like and thereby damaged, battery 26 cannot be charged using such power reception device 11. On the other hand, when damage to battery 26 is avoided, drive device 10 is driven to allow electrically powered vehicle 1 to travel.

Furthermore, even if power reception device 11 is damaged, battery 26 can be charged using charging device 12. Particularly, as shown in FIG. 1, the components of charging device 12 are located above floor panel 5. Thus, even if power reception device 11 contacts the ground or the like, charging device 12 is less likely to be damaged. In this way, according to electrically powered vehicle 1 of the present embodiment, battery 26 can be protected using power reception device 11, and also, both of the travelling function of electrically powered vehicle 1 and the charging function by charging device 12 can be ensured.

In addition, when power reception device 11 contactlessly receives electric power from power transmission device 27, the temperature of power reception device 11 is more likely to rise. However, since power reception device 11 is fixed to case 64 of battery 26, the heat of power reception device 11 can be dissipated to case 64.

Furthermore, case 64 is made of aluminum, an aluminum alloy, or the like. Accordingly, even if a magnetic flux formed around power reception device 11 flows into case 64, the temperature rise in case 64 is suppressed.

Although an explanation has been given referring to FIGS. 1 to 25 in the above with regard to an example that power reception device 11 is disposed on lower surface 74 of battery 26, power reception device 11 may also be disposed at a position away from battery 26.

FIG. 26 is a schematic diagram showing a modification of electrically powered vehicle 1. In an example shown in this FIG. 26, power reception device 11 is disposed forward of battery 26 and fixed to floor panel 5. In addition, lower surface 76 of power reception device 11 is located below lower surface 74 of battery 26. Also, lower surface 77 of fuel tank 13 is located above lower surface 76 of power reception device 11.

Also when power reception device 11 and the like are disposed in this way, power reception device 11 is more likely to contact bumps 80, 91 and stepped portion 83 before battery 26 and fuel tank 13 contact bumps 80, 91, stepped portion 83 and the like. Thus, battery 26 and fuel tank 13 can be protected.

Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A vehicle comprising:
   a floor panel forming a lower surface of the vehicle;
   a battery disposed on a lower surface of the floor panel; and
   a power reception device disposed below the floor panel and configured to contactlessly receive electric power from a power transmission device provided externally,
   the power reception device having a lower surface that is located below a lower surface of the battery,
   wherein the power reception device is disposed on the lower surface of the battery.

2. The vehicle according to claim 1, further comprising:
   an engine; and
   a fuel tank for storing fuel to be supplied to the engine, wherein
   the fuel tank has a lower surface that is located above the lower surface of the power reception device.

3. The vehicle according to claim 1, further comprising:
   an engine; and
   a fuel tank for storing fuel to be supplied to the engine, wherein
   the fuel tank has a lower surface that is located above the lower surface of the power reception device and the lower surface of the battery.

4. The vehicle according to claim 2, wherein a travelling distance that the vehicle can travel with fuel fully filling the fuel tank is longer than a travelling distance that the vehicle can travel with electric power from the battery fully charged.

5. The vehicle according to claim 1, further comprising a charging unit to which a charging plug provided externally is connected, the charging unit being configured to supply, to the battery, electric power supplied through the charging plug, wherein
   the charging unit is disposed above the floor panel.

* * * * *